US012280698B2

(12) United States Patent
Tranier et al.

(10) Patent No.: US 12,280,698 B2
(45) Date of Patent: Apr. 22, 2025

(54) STRUCTURAL SHROUD ASSEMBLY FOR PASSENGER SEAT

(71) Applicant: Safran Seats USA LLC, Gainesville, TX (US)

(72) Inventors: Romain Tranier, Costa Mesa, CA (US); Anthony Tran, Huntington Beach, CA (US)

(73) Assignee: Safran Seats USA LLC, Gainesville, TX (US)

( * ) Notice: Subject to any disclaimer, the term of this patent is extended or adjusted under 35 U.S.C. 154(b) by 143 days.

(21) Appl. No.: 18/021,354

(22) PCT Filed: Aug. 19, 2020

(86) PCT No.: PCT/US2020/047006
§ 371 (c)(1),
(2) Date: Feb. 14, 2023

(87) PCT Pub. No.: WO2022/039735
PCT Pub. Date: Feb. 24, 2022

(65) Prior Publication Data
US 2024/0034210 A1 Feb. 1, 2024

(51) Int. Cl.
*B60N 2/68* (2006.01)
*B60N 2/75* (2018.01)
*B60N 3/00* (2006.01)

(52) U.S. Cl.
CPC ............... *B60N 2/682* (2013.01); *B60N 2/68* (2013.01); *B60N 2/753* (2018.02); *B60N 3/004* (2013.01); *B60N 2002/684* (2013.01)

(58) Field of Classification Search
CPC ..... B60N 2/68; B60N 2/682; B60N 2002/684
See application file for complete search history.

(56) References Cited

U.S. PATENT DOCUMENTS

| 4,511,178 A | 4/1985 | Brennan |
| 5,133,587 A | 7/1992 | Hadden et al. |

(Continued)

FOREIGN PATENT DOCUMENTS

| CN | 108583390 A | 9/2018 |
| CN | 111349809 A | 6/2020 |

(Continued)

OTHER PUBLICATIONS

Chinese Application No. 202080103265.8, Office Action mailed on Apr. 30, 2024, 9 pages (7 pages of Original Document and 2 pages of English Translation).

(Continued)

*Primary Examiner* — Rodney B White
(74) *Attorney, Agent, or Firm* — Kilpatrick Townsend & Stockton LLP

(57) ABSTRACT

A structural shroud assembly for a passenger seat includes a structural shroud having a first end, a second end opposite from the first end, and a central cavity between the first end and the second end. An armrest pivot may be supported at the first end of the structural shroud. In some cases, the structural shroud may be an armrest. In other cases, the structural shroud is an upper spreader for the passenger seat configured to support a seat back of the passenger seat, and a lower spreader configured to receive at least one seat beam tube is attached to the upper spreader.

18 Claims, 5 Drawing Sheets

(56) References Cited

U.S. PATENT DOCUMENTS

| | | | |
|---|---|---|---|
| 5,575,533 A * | 11/1996 | Glance | B60R 22/20 |
| | | | 297/452.2 |
| 5,746,476 A * | 5/1998 | Novak | B60N 2/68 |
| | | | 297/452.2 X |
| 6,179,381 B1 | 1/2001 | Gevaert | |
| 6,505,890 B2 | 1/2003 | Riley | |
| 7,354,019 B2 * | 4/2008 | Bauer | B64D 11/06 |
| | | | 297/216.1 X |
| 9,365,138 B2 | 6/2016 | Mueller | |
| 10,227,023 B2 * | 3/2019 | Lasell | B60N 2/682 |
| 11,279,488 B2 * | 3/2022 | D'Alessio | B64D 11/0619 |
| 11,352,144 B2 * | 6/2022 | Murnan | B60N 2/682 |
| 11,518,281 B2 * | 12/2022 | Mansouri | B60N 2/682 |
| 11,584,274 B1 * | 2/2023 | Mansouri | B60N 2/42 |
| 12,054,264 B2 * | 8/2024 | Adcock | B60N 2/753 |
| 2001/0006302 A1 | 7/2001 | Nagayasu et al. | |
| 2004/0100137 A1 | 5/2004 | Johnson | |
| 2010/0187894 A1 | 7/2010 | Kismarton et al. | |
| 2012/0091764 A1 | 4/2012 | Cailleteau et al. | |
| 2014/0375090 A1 | 12/2014 | Wegenka et al. | |
| 2016/0243638 A1 | 8/2016 | Berube et al. | |
| 2017/0136698 A1 | 5/2017 | Kia et al. | |
| 2017/0184086 A1 | 6/2017 | Scancarello et al. | |
| 2019/0047710 A1 | 2/2019 | Bell et al. | |
| 2019/0070989 A1 | 3/2019 | Klap et al. | |
| 2019/0210163 A1 | 7/2019 | Berube et al. | |
| 2019/0299827 A1 | 10/2019 | Kinard et al. | |
| 2020/0056268 A1 | 2/2020 | Heard et al. | |
| 2020/0147684 A1 | 5/2020 | Bowden et al. | |
| 2021/0261197 A1 | 8/2021 | Czinger et al. | |
| 2023/0294579 A1 | 9/2023 | Ziemer | |
| 2023/0322138 A1 * | 10/2023 | Mansouri | B64D 11/0648 |
| | | | 297/173 |
| 2024/0034210 A1 * | 2/2024 | Tranier | B60N 3/004 |
| 2024/0058862 A1 | 2/2024 | Dilip et al. | |
| 2024/0140607 A1 * | 5/2024 | Madrid | B64D 11/0619 |

FOREIGN PATENT DOCUMENTS

| | | |
|---|---|---|
| CZ | 2018387 A3 | 2/2020 |
| EP | 3181450 A1 | 6/2017 |
| WO | 198203366 A1 | 10/1982 |

OTHER PUBLICATIONS

International Patent Application No. PCT/US2020/047006, International Search Report and Written Opinion, dated Apr. 12, 2021.
U.S. Appl. No. 18/021,383, Notice of Allowance mailed on Sep. 6, 2024, 17 pages.

* cited by examiner

STRUCTURAL SHROUD ASSEMBLY FOR PASSENGER SEAT

FIELD OF THE INVENTION

The field of the invention relates to seats for passenger vehicles, and more particularly to structural assemblies for various components of such seats.

BACKGROUND

Passenger vehicles, such as aircraft, buses, trains, ships, and automobiles, include passenger seats in which passengers can be seated and otherwise use during travel. Existing passenger seats include a number of structural components at various locations on the passenger seats. For example, spreaders may serve as an interface at which various components of the passenger seat such as an armrest, seat back, table, leg assembly, etc. can be connected. This typical/traditional construction imposes limitations such as a higher part count, material waste, and compromises between optimization and manufacturability SUMMARY The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a spreader assembly for a passenger seat includes a lower spreader and an upper spreader. The lower spreader is configured to receive at least one seat beam tube. The upper spreader is attached to the lower spreader and extends away from the lower spreader such that an end of the of the upper spreader is spaced apart from the lower spreader. In various embodiments, the upper spreader defines a central cavity extending through the upper spreader, and the upper spreader is configured to support a seat back of the passenger seat.

In some embodiments, the upper spreader includes a first shroud and a second shroud attached to the first shroud, and the first shroud and the second shroud together define the central cavity. In various embodiments, the lower spreader extends in a forward and aft direction, and the upper spreader assembly extends in a vertical direction relative to the lower spreader. In some cases, the spreader assembly also includes an armrest pivot supported at the end of the upper spreader spaced apart from the lower spreader. In some embodiments, the spreader assembly also includes an interface support that supports the armrest pivot at the end of the upper spreader spaced apart from the lower spreader.

In certain embodiments, the spreader assembly includes a table stop integrally formed with the upper spreader. In various cases, a cross-sectional shape of the lower spreader is different from a cross-sectional shape of the upper spreader.

According to certain embodiments of the present invention, a structural assembly for a passenger seat includes a structural shroud and an armrest pivot. The structural shroud includes a first end, a second end opposite from the first end, and a central cavity between the first end and the second end. In various embodiments, the first end defines an opening to the central cavity. The armrest pivot is supported at the first end of the structural shroud.

In various embodiments, the structural shroud is an armrest. In some embodiments, the structural shroud is an upper spreader for the passenger seat and is configured to support a seat back of the passenger seat. In such embodiments, the structural assembly may also include a lower spreader configured to receive at least one seat beam tube and attached to the upper spreader. In various embodiments, the lower spreader extends away from the upper spreader in a forward direction.

In some embodiments, the structural assembly includes an interface support that supports the armrest pivot at the first end of the structural shroud. In various examples, the structural shroud includes a first shroud and a second shroud attached to the first shroud, and the first shroud and the second shroud together define the central cavity.

According to certain embodiments of the present invention, a passenger seat assembly includes a spreader assembly having a lower spreader and an upper spreader. The lower spreader extends in a forward direction and defines a forward-most portion of the spreader assembly. The upper spreader is attached to the lower spreader and extends in a vertical direction relative to the lower spreader. The upper spreader defines a top-most portion of the spreader assembly and is hollow. In certain embodiments, the upper spreader is configured to support a seat back of the passenger seat assembly.

In various embodiments, a cross-sectional shape of the upper spreader is different from a cross-sectional shape of the lower spreader. In certain cases, the passenger seat assembly includes the seat back supported by the upper spreader, and the lower spreader is configured to attach to at least on seat beam tube. In some cases, the upper spreader includes a first shroud and a second shroud attached to the first shroud, and the first shroud and the second shroud together define a central cavity such that the upper spreader is hollow.

In some embodiments, the upper spreader is attached to an aft portion of the lower spreader. In various cases, the upper spreader is an aft-most portion of the spreader assembly. The passenger seat assembly may also include an armrest pivot supported at an end of the upper spreader opposite from the lower spreader. In some cases, a table stop may be integrally formed with the upper spreader.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide structural assemblies having a structural shroud for passenger seats. The structural assemblies include but are not limited to spreaders, armrests, and in-flight entertainment shrouds. While the structural assemblies are discussed for use with aircraft seats, they are by no means so limited. Rather, embodiments of the structural assemblies may be used in passenger seats or other seats of any type or otherwise as desired.

Figure 1:
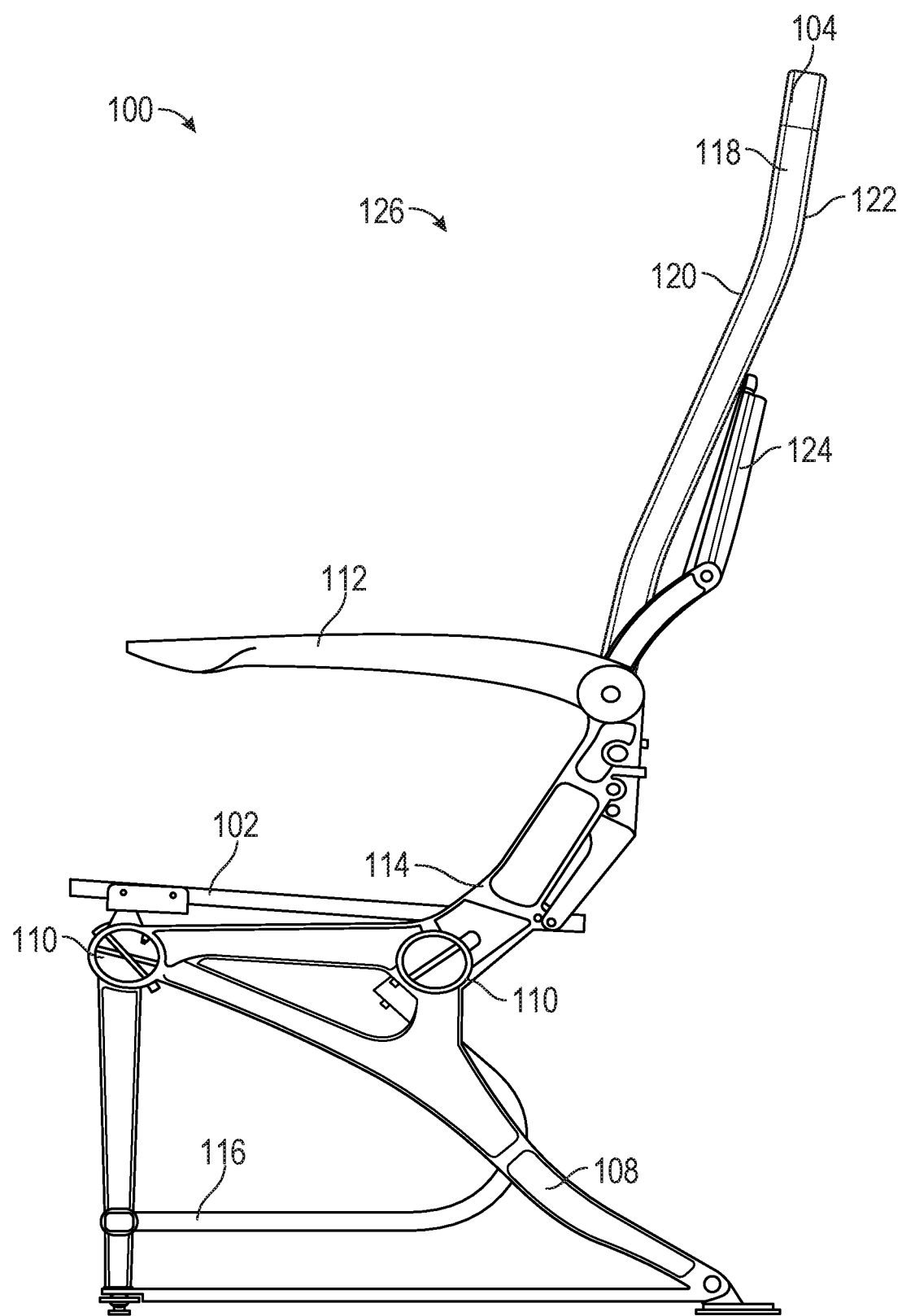
FIG. 1 is a side view of a passenger seat according to certain embodiments of the present invention.

As illustrated in FIG. 1, a passenger seat assembly 10) may include a seat base 102 and one or more seat backs 104 supported relative to the seat base 102. The number of seat backs 104 should not be considered limiting on the disclosure. In various examples, the number of seat backs 104 correspond with the number of passengers that the passenger seat is capable of carrying, and each seat back 104 and the corresponding portion of the seat base 102 define a particular passenger seat 126. In the example of FIG. 1, the passenger seat assembly 100 is capable of carrying one passenger, and accordingly has one seat back 104 and one passenger seat 126. However, in other examples, the passenger seat assembly 100 may be capable of carrying any desired number of passengers, such as one passenger, two passengers, three passengers, four passengers, or any other desired number of passengers. In these examples, the passenger seat assembly 100 can likewise have any desired number of corresponding seat backs 104.

The seat base 102 of the passenger seat assembly 100 generally includes a leg assembly 108 and at least one base frame tube 110. The seat base 102 may also include a support frame 106, an armrest 112, a spreader 114, a luggage bar 116, or other components. Cushioning (not illustrated) may be provided on any of the components of the seat base 102.

The seat back 104 is connected to the seat base 102, and is often pivotable relative to the seat base 102 such that the seat back 104 can be positioned in various positions such as a taxi-takeoff-landing (TTL) position, a reclined position, etc. In certain aspects, the seat back 104 is connected to the seat base 102 via the spreader 114. The seat back 104 includes a frame component 118 having a forward side 120 and an aft side 122. In some cases, other components of the passenger seat assembly 100 such as a tray table 124, an in-flight entertainment monitor, or various other components may be supported on and/or relative to the seat back 104. In certain cases, other components, such as the tray table 124 may be pivotably connected to the spreader 114, and the tray table 124 may be movable relative to the aft side 122 of the seat back 104 between a stowed position and a deployed position. Cushioning (not illustrated) may be provided on any of the components of the seat back 104.

Various structural assemblies of the seat base 102 and/or the seat back 104 may be subjected to different types of loads or forces when used. As one non-limiting example, with the spreader 114, a lower portion of the spreader 114 (e.g., the portion that engages the base frame tube(s) 110) may be subjected to pulling loads or forces during use, and an upper portion of the spreader 114 (e.g., the portion that connects with the seat back 104) may be subjected to pushing loads during use. Other structural assemblies of the seat base 102 and/or the seat back 104 include, but are not limited to armrests and in-flight entertainment shrouds. In certain aspects, and as discussed in detail below, one or more of the structural assemblies may include a structural shroud.

Figure 2:
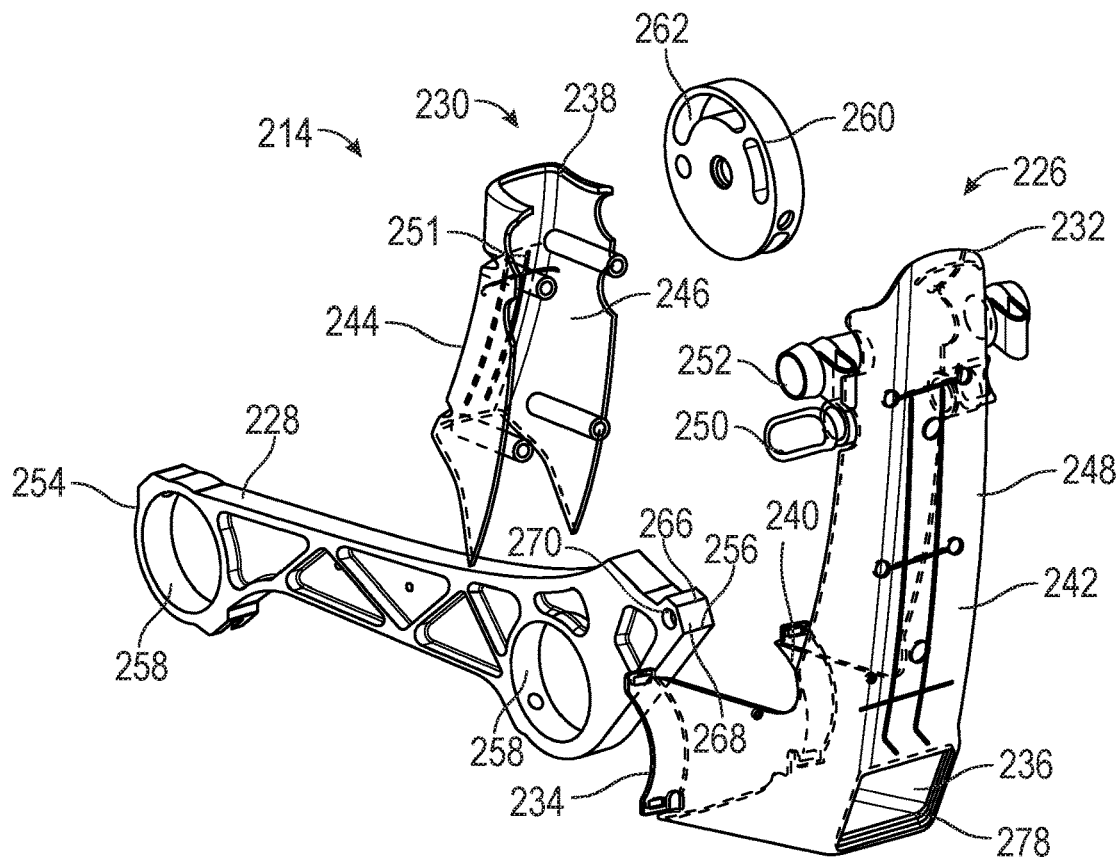
FIG. 2 is an exploded view of a spreader assembly according to certain embodiments of the present invention.
Figure 3:
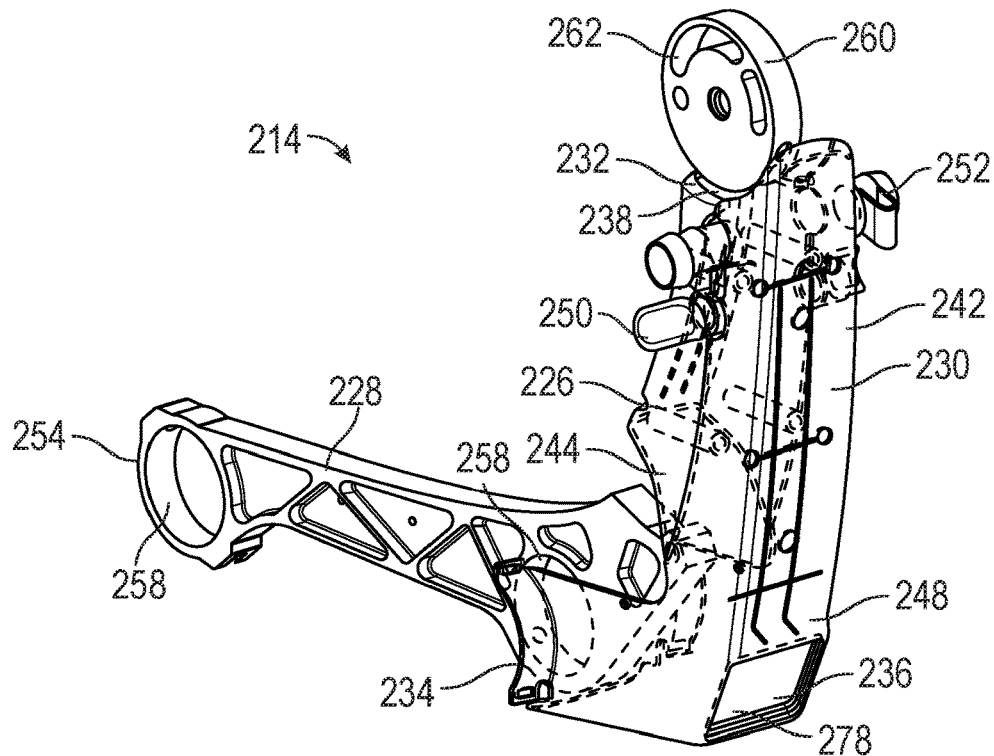
FIG. 3 is a perspective view of the spreader assembly of FIG. 2.

FIGS. 2 and 3 illustrate an example of a spreader assembly 214 having an upper spreader 226 and a lower spreader 228. Similar to the spreader 114, the spreader assembly 214 is configured to connect a seat back with the seat base as well as support various other components such as a tray table. In various embodiments, and as discussed below, the upper spreader 226 is configured to engage with and/or support a seat back of the passenger seat and/or other components such as a tray table and may be subject to pushing loads during use, and the lower spreader 228 is configured to engage with the base frame tube(s) 110 and may be subject to pulling loads during use.

In various embodiments, the upper spreader 226 is a structural shroud 230 having a first end 232 and a second end 234 opposite from the first end 232. The particular shape of the structural shroud 230 should not be considered limiting on the disclosure. The structural shroud 230 also has an inner surface 246 and an outer surface 248 extending from the first end 232 to the second end 234. As illustrated in FIGS. 2 and 3, the inner surface 246 defines a central cavity 236 such that the structural shroud 230 is hollow along a length of the structural shroud 230. In other words, a cross-sectional shape of the structural shroud 230 may have a hollow center due to the central cavity 236. In various examples, at least one of the first end 232 or the second end 234 defines an opening providing access to the central cavity 236. In the embodiment of FIGS. 2 and 3, the first end 232 includes a first opening 238 providing access to the central cavity 236 and the second end 234 includes a second opening 240 providing access to the central cavity 236. Optionally, an intermediate opening 278 between the first end 232 and the second end 234 providing access to the central cavity 236. In some non-limiting examples, a component of the passenger seat assembly, including but not limited to a power outlet, USB outlet, or other amenity or component of the passenger seat may be provided in the intermediate opening 278. In certain aspects, the first end 232 may be a top-most portion of the assembled upper spreader 226 and lower spreader 228. In some embodiments, a stiffener or reinforcing component 251 may optionally be provided on the structural shroud 230. The stiffener or reinforcing component 251 may be provided on the inner surface 246 and/or the outer surface 248 as desired, and may stiffen the structural shroud 230. In various embodiments, the stiffener or reinforcing component 251 may be a separate component attached to the structural shroud or may be integrally formed with the structural shroud.

In some embodiments, the structural shroud 230 includes a first shroud 242 and a second shroud 244 connected to the first shroud 242. In various cases, the first shroud 242 may be connected to the second shroud 244 via various suitable devices or mechanisms as desired such that the second shroud 244 may be selectively removed from the first shroud 242 (e.g., to allow greater access to the central cavity 236. As one non-limiting example, the second shroud 244 may be removably connected to the first shroud 242 via mechanical fasteners such that cabling or wiring or other features within the central cavity 236 may be accessed as desired. The structural shroud 230 may be constructed from various suitable materials, including but not limited to aluminum, stainless steel, aramid fibers, polycarbonate, polypropylene, other metallic materials, composite materials, or other similar materials. In one non-limiting example, the structural shroud 230 is constructed from a reinforced plastic such as a sheet molding compound.

As illustrated in FIGS. 2 and 3, the lower spreader 228 includes a forward end 254 and an aft end 256 opposite of the forward end 254. The particular shape of the lower spreader 228 should not be considered limiting on the disclosure. Compared to the upper spreader 226, the lower spreader 228 does not include an inner surface extending along a length of the lower spreader and/or a central cavity. In other words, a cross-sectional shape of the lower spreader 228 may be different from that of the upper spreader 226. In some non-limiting embodiments, a center of the cross-sectional shape of the lower spreader 228 may be solid other than locations with apertures for the base frame tube(s) (discussed below). In certain aspects, the forward end 254 may be a forward-most portion of the spreader assembly 214. In various aspects, the aft end 256 may be an aft-most portion and/or a lowermost portion of the spreader assembly 214, although it need not be the aft-most and/or the lowermost portion. In the example of FIGS. 2 and 3, a portion of the upper spreader 226 extends aft of the aft end 256. In other embodiments, the lower spreader 228 may be a structural shroud similar to the structural shroud 230 and may define a central cavity such that the lower spreader 228 is hollow. In such embodiments, the lower spreader 228 may be a separate component that is connected to the upper spreader 226 via various suitable connectors or connecting mechanisms as desired, or the lower spreader 228 and the upper spreader 226 may be formed as a monolithic or integral component.

In various embodiments, the lower spreader 228 includes one or more apertures 258 defined through a thickness of the lower spreader 228 between the forward end 254 and the aft end 256 that receive and engage base frame tube(s) of the passenger seat assembly. In the embodiment of FIGS. 2 and 3, the lower spreader 228 includes two apertures 258. In other embodiments, or other suitable interfacing for the base frame tube(s) may be provided. The lower spreader 228 may also include interfacing for other components of the seat base of the passenger seat assembly as desired. The lower spreader 228 may be constructed from various materials as desired suitable for engaging the base frame tube(s) and the upper spreader 226.

The upper spreader 226 may be connected to the lower spreader 228 proximate to the second end 234. In various examples, the lower spreader 228 may include an interface 266 that may be used to connect the upper spreader 226 with the lower spreader 228. As best illustrated in FIG. 2, in the embodiment of FIGS. 2 and 3, the interface 266 includes a ridge 268 having a securing aperture 270. Various other types of interfaces 266 may be utilized as desired, and the ridge 268 and/or securing aperture 270 need not be included. In some cases, the lower spreader 228 may be partially received within the central cavity 236, although it need not in other examples (see, e.g., FIG. 4). The upper spreader 226 may be connected to the lower spreader 228 via various suitable devices or mechanisms as desired, including but not limited to mechanical fasteners.

In some cases, connectors and/or other components that engage with features of the seat back may optionally be provided on the structural shroud 230 and extend outwards from the outer surface 248. Such connectors and/or other components may be connected to the structural shroud 230 via various suitable mechanisms or devices as desired, or they may be integrally or monolithically formed with the structural shroud 230. In the embodiment of FIGS. 2 and 3, the structural shroud 230 includes a table pivot 250 and a table stop 252 integrally formed with the structural shroud 230.

Optionally, and as illustrated in FIGS. 2 and 3, the spreader assembly 214 includes an armrest pivot 260 supported proximate to the first end 232 of the upper spreader 226. The armrest pivot 260 may connected to the upper spreader 226 via various suitable devices or mechanisms as desired. In certain aspects, the armrest pivot 260 includes one or more pivot grooves 262 that may interface with an armrest such that the armrest is pivotable relative to the spreader assembly 214.

The spreader assembly 214, which may be referred to as a "split" spreader assembly, may be advantageous over traditional spreaders. In one aspect, the split spreader assembly 214 may maximize the inertia of the upper spreader 226 and reduce the mass needed to achieve the required stiffness to withstand forces from the armrest, seat back, etc. The split spreader assembly 214 may also optionally reduce the number of parts required for a spreader by embedding one or more of the components (e.g., stiffener, table stops, pivots, etc.), into the structural shroud. In some cases, the split spreader assembly 214 may reduce the amount of material waste that is caused by the typical crescent shape of traditional spreaders. The split spreader assembly 214 may also optimize stiffness and strength requirements for portion that engages the armrest, seat back, etc. independently from the stiffness and strength requirements for the portion that engages the base frame tube(s) and needing to withstand 16G loads.

Figure 4:
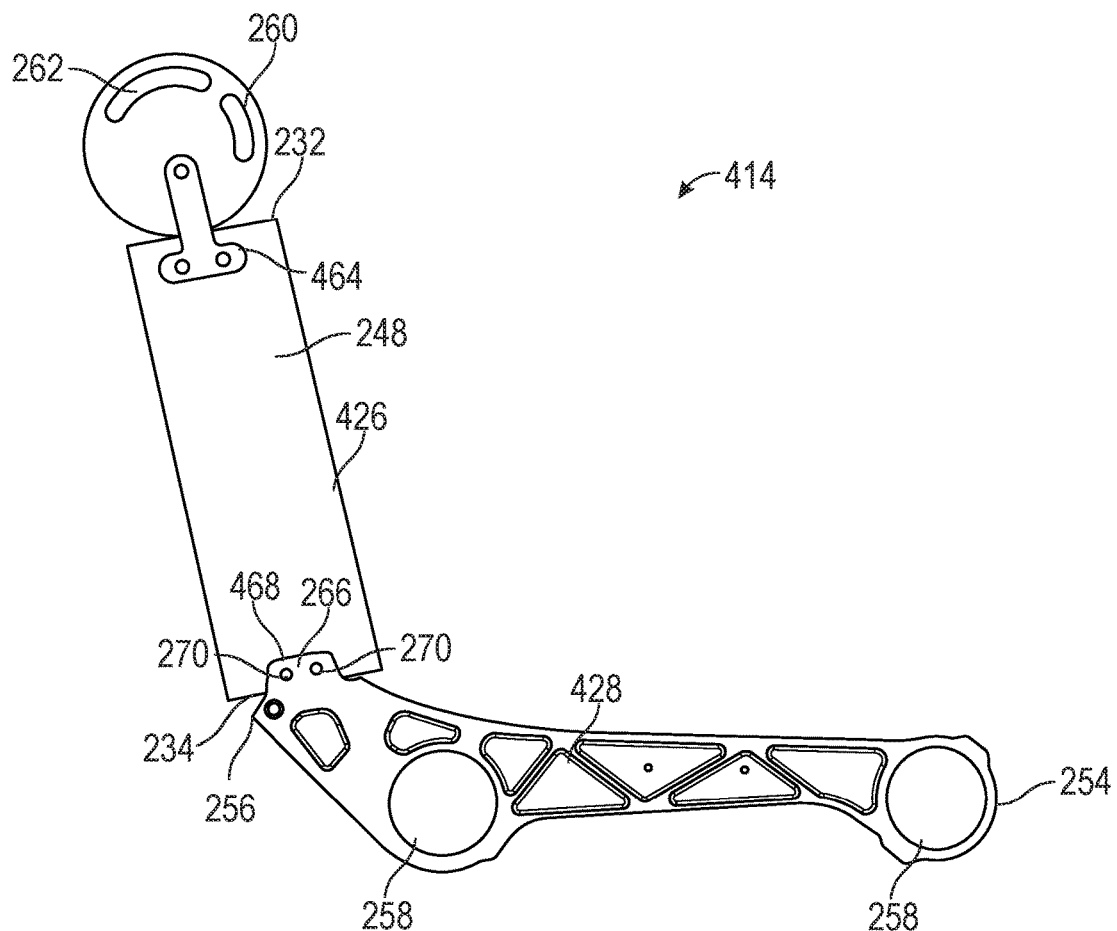
FIG. 4 is a side view of a spreader assembly according to certain embodiments of the present invention.
Figure 5:
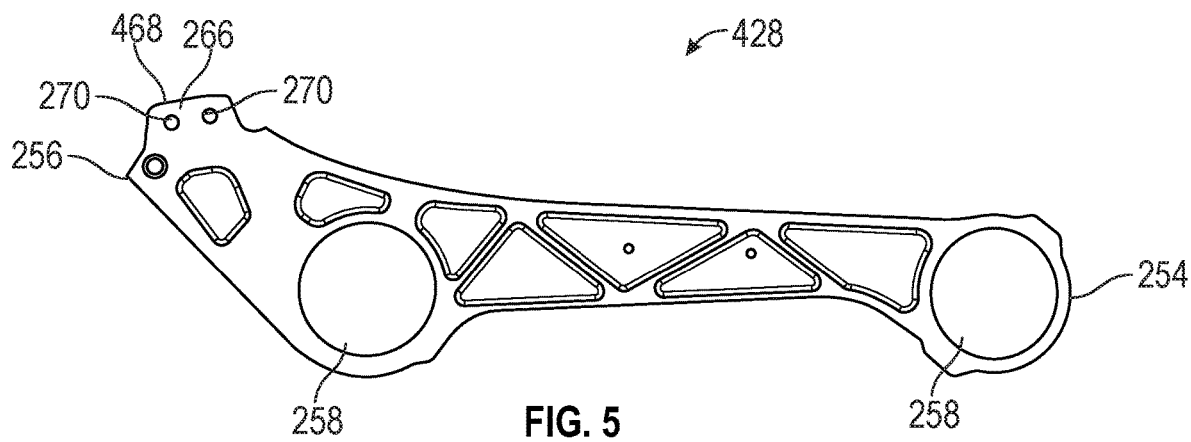
FIG. 5 is a side view of a lower spreader of the spreader assembly of FIG. 4.

FIGS. 4 and 5 illustrate another embodiment of a spreader assembly 414 that is substantially similar to the spreader assembly 214 and includes an upper spreader 426 and a lower spreader 428. The upper spreader 426 is similar to the upper spreader 226 and includes a structural shroud 430. Compared to the upper spreader 226, the structural shroud 430 of the upper spreader 426 has a different shape than the structural shroud 230, and the structural shroud 430 is a monolithic and does not include the first shroud 242 and the second shroud 244. As illustrated in FIG. 4, an interface component 464 may connect the armrest pivot 260 with the upper spreader 426. The lower spreader 428 is substantially similar to the lower spreader 428 except that the interface 266 includes a ridge 468 having two securing apertures 270.

Figure 6:
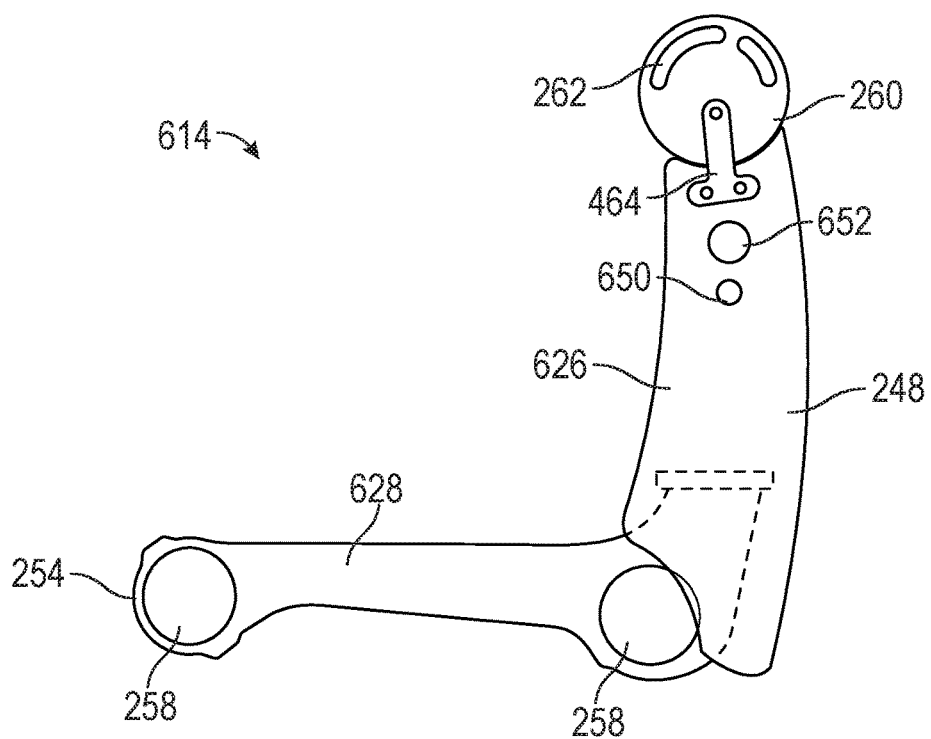
FIG. 6 is a side view of a spreader assembly according to certain embodiments of the present invention.
Figure 7:
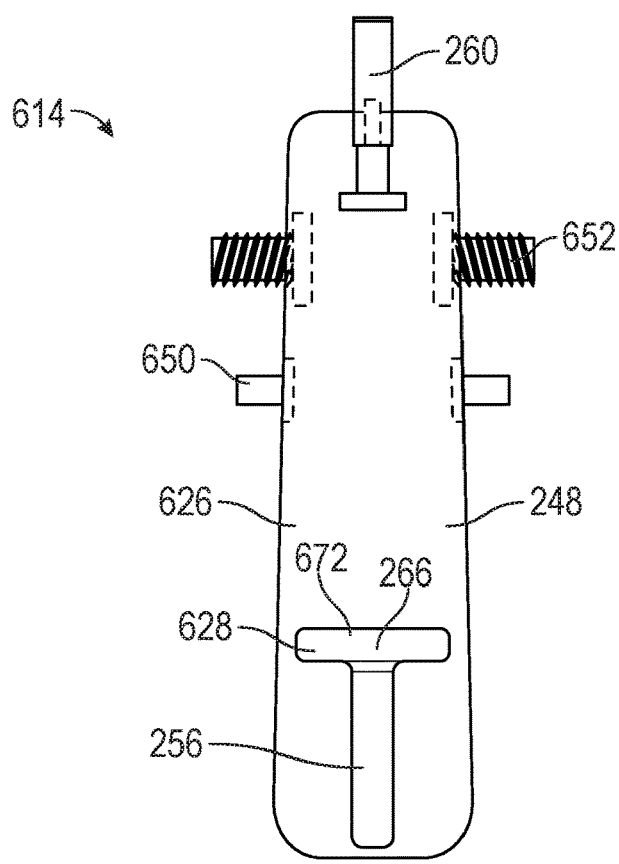
FIG. 7 is a rear view of the spreader assembly of FIG. 6.

FIGS. 6 and 7 illustrate another embodiment of a spreader assembly 614 that is substantially similar to the spreader assembly 214 and includes an upper spreader 626 and a lower spreader 628. The upper spreader 626 is similar to the upper spreader 226 and includes a structural shroud 630. Compared to the upper spreader 226, the structural shroud 630 of the upper spreader 626 has a different shape than the structural shroud 230, and the structural shroud 630 is a monolithic and does not include the first shroud 242 and the second shroud 244. The lower spreader 428 is substantially similar to the lower spreader 428 except that the interface 266 includes a ledge 672 that engages the upper spreader 626 and secures the lower spreader 628 to the upper spreader 626 without requiring separate fasteners or other joining devices. Compared to the spreader assembly 214, a table pivot 650 and a table stop 652 are separate components from the structural shroud 630 that are supported on the structural shroud 630.

Figure 8:
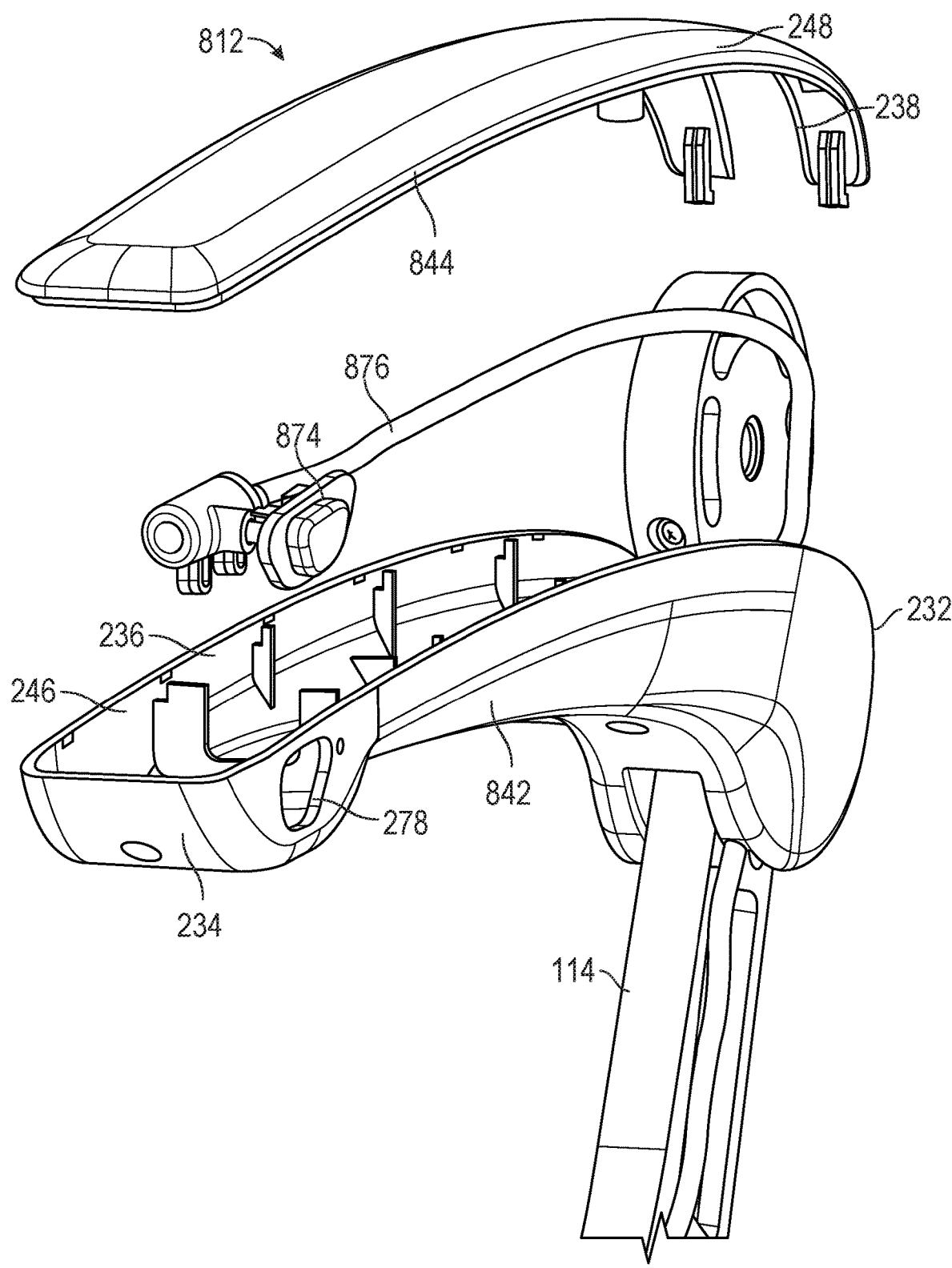
FIG. 8 is an exploded view of an armrest assembly according to certain embodiments of the present invention.

FIG. 8 illustrates an example of an armrest 812 having a structural shroud 830. Similar to the structural shroud 230, the structural shroud 830 includes a first shroud 842 and a second shroud 844. Compared to the structural shroud 230, the second end 234 of the structural shroud 830 does not include second opening 240. In the embodiment of FIG. 8, the intermediate opening 278 is configured to receive an actuator 874 of the armrest 812, and cabling 876 for the actuator 874 may be housed within the central cavity 236.

A collection of exemplary embodiments are provided below, including at least some explicitly enumerated as "Illustrations" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Illustration 1. A spreader assembly for a passenger seat, the spreader assembly comprising: a lower spreader configured to receive at least one seat beam tube; and an upper spreader attached to the lower spreader and extending away from the lower spreader such that an end of the of the upper spreader is spaced apart from the lower spreader, wherein the upper spreader defines a central cavity extending through the upper spreader, and wherein the upper spreader is configured to support a seat back of the passenger seat.

Illustration 2. The spreader assembly of any preceding or subsequent illustrations or combination of illustrations, wherein the upper spreader comprises a first shroud and a second shroud attached to the first shroud, and wherein the first shroud and the second shroud together define the central cavity.

Illustration 3. The spreader assembly of any preceding or subsequent illustrations or combination of illustrations, wherein the lower spreader extends in a forward and aft direction, and wherein the upper spreader assembly extends in a vertical direction relative to the lower spreader.

Illustration 4. The spreader assembly of any preceding or subsequent illustrations or combination of illustrations, further comprising an armrest pivot supported at the end of the upper spreader spaced apart from the lower spreader.

Illustration 5. The spreader assembly of any preceding or subsequent illustrations or combination of illustrations, further comprising an interface support, wherein the interface support supports the armrest pivot at the end of the upper spreader spaced apart from the lower spreader.

Illustration 6. The spreader assembly of any preceding or subsequent illustrations or combination of illustrations, further comprising a table stop integrally formed with the upper spreader.

Illustration 7. The spreader assembly of any preceding or subsequent illustrations or combination of illustrations, wherein a cross-sectional shape of the lower spreader is different from a cross-sectional shape of the upper spreader.

Illustration 8. A structural assembly for a passenger seat, the structural assembly comprising: a structural shroud comprising a first end, a second end opposite from the first end, and a central cavity between the first end and the second end, wherein the first end defines an opening to the central cavity; and an armrest pivot supported at the first end of the structural shroud.

Illustration 9. The structural assembly of any preceding or subsequent illustrations or combination of illustrations, wherein the structural shroud is an armrest.

Illustration 10. The structural assembly of any preceding or subsequent illustrations or combination of illustrations, wherein the structural shroud is an upper spreader for the passenger seat configured to support a seat back of the passenger seat, and wherein the structural assembly further comprises: a lower spreader configured to receive at least one seat beam tube, wherein the upper spreader attached to the lower spreader, and wherein the lower spreader extends away from the upper spreader in a forward direction.

Illustration 11. The structural assembly of any preceding or subsequent illustrations or combination of illustrations, further comprising an interface support, wherein the interface support supports the armrest pivot at the first end of the structural shroud.

Illustration 12. The structural assembly of any preceding or subsequent illustrations or combination of illustrations, wherein the structural shroud comprises a first shroud and a second shroud attached to the first shroud, and wherein the first shroud and the second shroud together define the central cavity.

Illustration 13. A passenger seat assembly comprising a spreader assembly, the spreader assembly comprising: a lower spreader extending in a forward direction and defining a forward-most portion of the spreader assembly; and an upper spreader attached to the lower spreader and extending in a vertical direction relative to the lower spreader, wherein the upper spreader defines a top-most portion of the spreader assembly, wherein the upper spreader is hollow, and wherein the upper spreader is configured to support a seat back of the passenger seat assembly.

Illustration 14. The passenger seat assembly of any preceding or subsequent illustrations or combination of illustrations, wherein a cross-sectional shape of the upper spreader is different from a cross-sectional shape of the lower spreader.

Illustration 15. The passenger seat assembly of any preceding or subsequent illustrations or combination of illustrations, further comprising the seat back supported by the upper spreader, and wherein the lower spreader is configured to attach to at least on seat beam tube.

Illustration 16. The passenger seat assembly of any preceding or subsequent illustrations or combination of illustrations, wherein the upper spreader comprises a first shroud and a second shroud attached to the first shroud, and wherein the first shroud and the second shroud together define a central cavity such that the upper spreader is hollow.

Illustration 17. The passenger seat assembly of any preceding or subsequent illustrations or combination of illustrations, wherein the upper spreader is attached to an aft portion of the lower spreader.

Illustration 18. The passenger seat assembly of any preceding or subsequent illustrations or combination of illustrations, wherein the upper spreader is an aft-most portion of the spreader assembly.

Illustration 19. The passenger seat assembly of any preceding or subsequent illustrations or combination of illustrations, further comprising an armrest pivot supported at an end of the upper spreader opposite from the lower spreader.

Illustration 20. The passenger seat assembly of any preceding or subsequent illustrations or combination of illustrations, further comprising a table stop integrally formed with the upper spreader.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A spreader assembly for a passenger seat, the spreader assembly comprising:
   a lower spreader configured to receive at least one seat beam tube; and
   an upper spreader attached to the lower spreader and extending away from the lower spreader such that an end of the of the upper spreader is spaced apart from the lower spreader, wherein the upper spreader defines a central cavity extending through the upper spreader, and wherein the upper spreader is configured to support a seat back of the passenger seat, further comprising a table stop integrally formed with the upper spreader.

2. The spreader assembly of claim 1, wherein the upper spreader comprises a first shroud and a second shroud attached to the first shroud, and wherein the first shroud and the second shroud together define the central cavity.

3. The spreader assembly of claim 1, wherein the lower spreader extends in a forward and aft direction, and wherein the upper spreader assembly extends in a vertical direction relative to the lower spreader.

4. The spreader assembly of claim 1, further comprising an armrest pivot supported at the end of the upper spreader spaced apart from the lower spreader.

5. The spreader assembly of claim 4, further comprising an interface support, wherein the interface support supports the armrest pivot at the end of the upper spreader spaced apart from the lower spreader.

6. The spreader assembly of claim 1, wherein a cross-sectional shape of the lower spreader is different from a cross-sectional shape of the upper spreader.

7. A structural assembly for a passenger seat, the structural assembly comprising:
   a structural shroud comprising a first end, a second end opposite from the first end, and a central cavity between the first end and the second end, wherein the first end defines an opening to the central cavity; and
   an armrest pivot supported at the first end of the structural shroud.

8. The structural assembly of claim 7, wherein the structural shroud is an armrest.

9. The structural assembly of claim 7, wherein the structural shroud is an upper spreader for the passenger seat configured to support a seat back of the passenger seat, and wherein the structural assembly further comprises:
   a lower spreader configured to receive at least one seat beam tube, wherein the upper spreader attached to the lower spreader, and wherein the lower spreader extends away from the upper spreader in a forward direction.

10. The structural assembly of claim 7, further comprising an interface support, wherein the interface support supports the armrest pivot at the first end of the structural shroud.

11. The structural assembly of claim 7, wherein the structural shroud comprises a first shroud and a second shroud attached to the first shroud, and wherein the first shroud and the second shroud together define the central cavity.

12. A passenger seat assembly comprising a spreader assembly, the spreader assembly comprising:
   a lower spreader extending in a forward direction and defining a forward-most portion of the spreader assembly, the lower spreader including a forward end and an aft end opposite of the forward end, the lower spreader including one or more apertures defined through a thickness of the lower spreader between the forward end and the aft end that receive and engage one or more base frame tubes of the passenger seat assembly; and
   an upper spreader attached to the lower spreader and extending in a vertical direction relative to the lower spreader, wherein the upper spreader is a structural shroud, wherein the upper spreader defines a top-most portion of the spreader assembly, wherein the upper spreader is configured to support a seat back of the passenger seat assembly such that a connector or component that engages with features of the seat back is provided on the structural shroud,
   wherein the upper spreader comprises a first shroud and a second shroud attached to the first shroud, wherein the first shroud and the second shroud together define an unfilled central cavity and such that the upper spreader is hollow along a length of the upper spreader.

13. The passenger seat assembly of claim 12, wherein a cross-sectional shape of the upper spreader is different from a cross-sectional shape of the lower spreader.

14. The passenger seat assembly of claim 12, further comprising the seat back supported by the upper spreader, and wherein the lower spreader is configured to attach to at least on seat beam tube.

15. The passenger seat assembly of claim 12, wherein the upper spreader is attached to an aft portion of the lower spreader.

16. The passenger seat assembly of claim 15, wherein the upper spreader is an aft-most portion of the spreader assembly.

17. The passenger seat assembly of claim 12, further comprising an armrest pivot supported at an end of the upper spreader opposite from the lower spreader.

18. The passenger seat assembly of claim 12, further comprising a table stop integrally formed with the upper spreader.

* * * * *